(12) United States Patent
Bouie

(10) Patent No.: US 9,758,186 B2
(45) Date of Patent: Sep. 12, 2017

(54) CARRIAGE SAFETY APPARATUS

(71) Applicant: Kenneth Bouie, Berkeley, CA (US)

(72) Inventor: Kenneth Bouie, Berkeley, CA (US)

(*) Notice: Subject to any disclaimer, the term of this patent is extended or adjusted under 35 U.S.C. 154(b) by 0 days.

(21) Appl. No.: 15/140,458

(22) Filed: Apr. 27, 2016

(65) Prior Publication Data

US 2016/0375922 A1 Dec. 29, 2016

Related U.S. Application Data

(60) Provisional application No. 62/153,229, filed on Apr. 27, 2015.

(51) Int. Cl.
*B62B 9/00* (2006.01)
*B62B 7/06* (2006.01)
*B62B 7/04* (2006.01)

(52) U.S. Cl.
CPC .............. *B62B 9/005* (2013.01); *B62B 7/042* (2013.01); *B62B 7/06* (2013.01)

(58) Field of Classification Search
CPC ............ B62B 9/003; B62B 7/042; B62B 7/06
See application file for complete search history.

(56) References Cited

U.S. PATENT DOCUMENTS

| | | | | |
|---|---|---|---|---|
| 2,556,121 A | * | 6/1951 | Thomas | A61G 5/10 280/304.1 |
| 5,580,069 A | * | 12/1996 | Trejo | B62J 99/00 280/1.5 |
| 7,373,942 B1 | * | 5/2008 | Yeager | A61H 3/00 135/67 |
| 2006/0292533 A1 | * | 12/2006 | Selod | A63B 71/0686 434/247 |

* cited by examiner

*Primary Examiner* — John Walters
*Assistant Examiner* — James Triggs
(74) *Attorney, Agent, or Firm* — Perkins Coie LLP

(57) ABSTRACT

Various of the disclosed embodiments concern a safety apparatus that is positioned adjacent to and attached to a carriage device, thereby substantially improving the safety of individuals seated in the carriage device. The safety apparatus can include a structural frame, one or more front contacts, one or more rear contacts, a support bar, one or more handles, and at least one connector. The at least one connector allows the safety apparatus to be detachably connected or fixedly attached to the carriage device. The safety apparatus may also be adjustable or collapsible, which permits its footprint to be reduced when not in use. In some embodiments, the safety apparatus includes a support bar and/or basket that allows a user to hang or place items, such as a purse or diaper bag, without causing the safety apparatus or the carriage device to become unbalanced.

10 Claims, 9 Drawing Sheets

CARRIAGE SAFETY APPARATUS

CROSS-REFERENCE TO RELATED APPLICATIONS

This application claims the benefit of U.S. Provisional Patent Application No. 62/153,229, filed on Apr. 27, 2015, which is incorporated herein its entirety by this reference thereto.

RELATED FIELD

Various embodiments relate generally to safety apparatuses. More specifically, various embodiments relate to safety apparatuses that are connected to and positioned adjacent to carriage devices.

BACKGROUND

Carriage devices, such as strollers and wheelchairs, typically place a stationary party, e.g. child, in front of the user, e.g. parent. In many instances, the stationary party is placed approximately 36 inches in front of the user. But this separation can cause a number of issues. For instance, the stationary party, who may be completely immobile or have limited mobility, is placed in dangerous situations prior to the user. As one example, a child seated in a stroller typically enters a road and is at risk of being struck by a vehicle before the parent.

The stationary party may also be in dangerous locations or situations before the user is able to recognize potential dangers and react accordingly. Such scenarios can prove particularly dangerous if a stationary party is unable to assist the user in determining the severity of the situation, such as a young child, or if the user's reaction time has been impaired. These issues are often worsened by busy intersections and crowded sidewalks.

Such issues also plague those carriage devices that trail behind the user, such as Burley® bicycle trailers. That is, the stationary party may remain in a dangerous location after the user has exited.

SUMMARY

Introduced herein are safety apparatuses that are positioned adjacent to and attached to a carriage device. The lateral placement of the carriage device substantially improves the safety of individuals, also called stationary parties, that are seated in the carriage device. Various embodiments include a structural frame, one or more front contacts, one or more rear contacts, one or more support bars, one or more handles, and at least one connector. In some embodiments, the at least one connector allows the safety apparatus to be detachably connected to the carriage device. That is, the safety apparatus may be capable of being readily and repeatedly attached and detached without the use of any tools. In other embodiments, the at least one connector allows the safety apparatus to be fixedly, i.e. permanently or semi-permanently, attached to the carriage device.

Various embodiments of the safety apparatus may be adjustable or collapsible, which permits the overall footprint of the safety apparatus to be reduced when not in use. For example, some components of the safety apparatus, e.g. structural frame, one or more support bars, include a telescoping mechanism that allow the width, height, and/or length to be adjusted. The safety apparatus may also include hooks, baskets, trays, etc., that allow a user to hang or place items without causing the safety apparatus or the carriage device to become unbalanced.

Also introduced herein are methods of using safety apparatuses configured to be positioned adjacent to carriage devices. Various embodiments of the methods described herein include providing a carriage device, ensuring the carriage device is fully open and locked, providing a safety apparatus that includes at least one connector, and attaching the safety apparatus to the carriage devices using the at least one connector. In some embodiments, the connector allows the safety apparatus to be detachably connected to the carriage device, while in other embodiments the connector allows the safety apparatus to be fixedly attached to the carriage device. The methods can further include securely locking any attachments to the safety apparatus, carriage device, or both. Possible attachments include, but are not limited to, storage baskets and trays, hooks for bags, clothing, etc., water bottle cages, cup holders, and light accessories.

DETAILED DESCRIPTION

Various embodiments are described herein that relate to safety apparatuses and, more specifically, to safety apparatuses that are positioned laterally adjacent to a carriage device, thereby substantially improving the safety of a stationary party seated in the carriage device.

Figure 1:
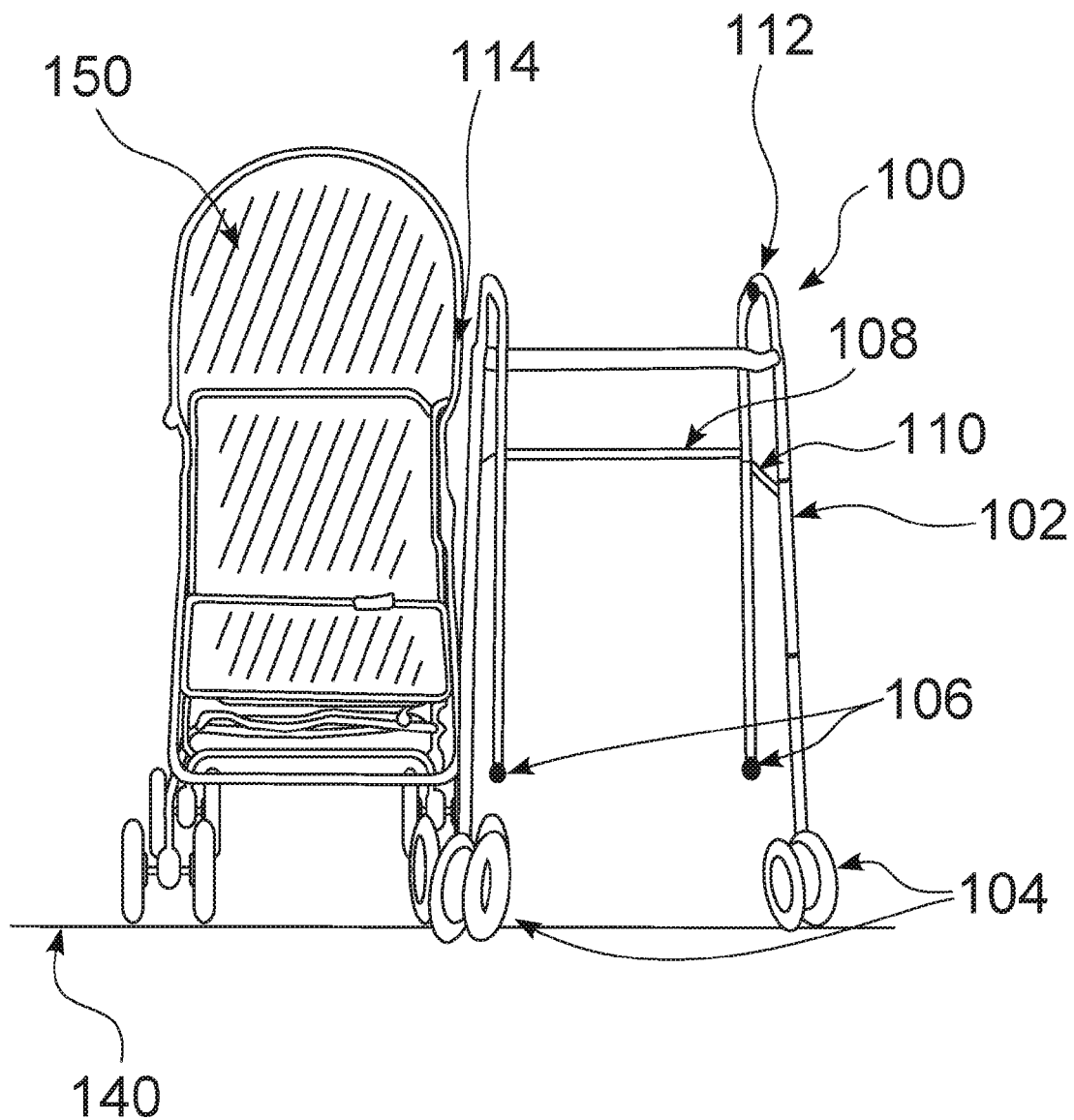
FIG. 1 is a perspective view of a safety apparatus in the open configuration according to various embodiments of the disclosure.

FIG. 1 is a perspective view of a safety apparatus 100 in the open configuration. In some embodiments, the safety apparatus 100 includes a structural frame 102, one or more front contacts 104, one or more rear contacts 106, a front support bar 108, one or more lateral support bars 110, one or more handles 112, and at least one connector 114. In some embodiments, the structural frame is a substantially U-shaped member. The safety apparatus 100 can be attached to a carriage device 150, which is positioned laterally adjacent to the safety apparatus 100. As shown in FIG. 1, the safety apparatus 100 is adjacent to the carriage device 150. The safety apparatus 100 can generally be positioned along either the left or right side of the carriage device, although in some embodiments the safety apparatus 100 may be designed to attach to particular locations, on a particular side, etc.

The structural frame 102 can be made of metal, e.g. aluminum, steel, or a polymer, e.g. polyvinyl chloride (PVC), carbon fiber. In some embodiments, the material of the structural frame 102 is selected to be rugged and weather-resistant. The front support bar 108 (which may also be referred to as a "spacer"), the lateral support bar 110, and/or the structural frame 102 can be made of the same or different materials. In some embodiments, the front support bar, or spacer, can be folded to bring distinct pieces of the structural frame closer together. For example, the structural frame 102 may be made of carbon fiber, while the front support bar 108 and lateral support bar 110 are made of steel. As another example, the structural frame 102, front support bar 108, and lateral support bar 110 may be made of aluminum. The material(s) can be selected depending on the intended use of the safety apparatus 100 and carriage device 150. For instance, safety apparatuses 100 designed for frequent travel may be constructed of lightweight materials.

In some embodiments, the front support bar 108 and/or lateral support bar 110 are configured to be compatible with accessories, such as water bottle cages, purses, diaper bags, light accessories, etc. The structural frame 102 can also support baskets, trays, and hooks that allow a user or a stationary party to store and use items. In some embodiments the baskets, trays, and hooks are fixed, e.g. welded, to the structural frame 102 and immovable, while in other embodiments the baskets, trays, and hooks are movable and can be affixed at various locations. The front support bar 108 and lateral support bar 110 allow accessories to be placed or hung on the structural frame 102, which provides easy access without causing the safety apparatus 100 to tip over.

The front contacts 104 and the rear contacts 106 stabilize the structural frame 102 where it touches the ground 140. The number of front contacts 104 and rear contacts 106 can vary. For example, the embodiment of FIG. 1 includes two front contacts 104 and two rear contacts 106. In some embodiments, the front contacts 104, the rear contacts 106, or both are wheels, which may also be referred to as casters. In other embodiments, the front contacts 104, the rear contacts 106, or both include rubber tips or feet. Other supports could also be used, such as glides, adjustable leveling feet, bumper feet, ball bearings, and vibration mounts/joints. The front contacts 104 and the rear contacts 106 can include any combination of such supports. For example, the front contacts 104 may be wheels, while the rear contacts 106 are rubber tips.

The safety apparatus 100 may also include handles 112 that are coupled to the structural frame 102 or are part of, i.e. integrated into, the structural frame 102. In some embodiments, the handles 112 include cloth, foam, or plastic handle grips wrapped around the structural frame 102. The handles 112, whether coupled to or integrated into the structural frame 102, can be positioned on any side of the structural frame 102 and oriented in any direction. For example, the handle grips are integrated into the structural frame 102 and oriented downward in some embodiments, while handles extend outward from the structural frame 102 in other embodiments.

The safety apparatus 100 also includes one or more connectors 114 that allow the safety apparatus 100 to be connected to the carriage device 150. In some embodiments, the connectors 114 allow the safety apparatus 100 to be detachably connected to and from the carriage device 150. Detachably connected means, in general, the safety apparatus 100 can be readily and repeatedly attached and detached to a carriage device 150 without the use of any tools. For example, the connector(s) 114 can be a quick-release button, a turn-knob, a clip, magnet(s), etc. In some embodiments, the connectors 114 allow the safety apparatus 100 to be fixedly attached to the carriage device 150. Fixedly attached means, in general, the safety apparatus 100 is incapable of being attached and detached quickly without the use of tools. Fixedly attached may be used interchangeably with permanently or semi-permanently attached. For example, the connectors 114 can include a securing plate that includes nuts, screws, etc.

Figure 2:
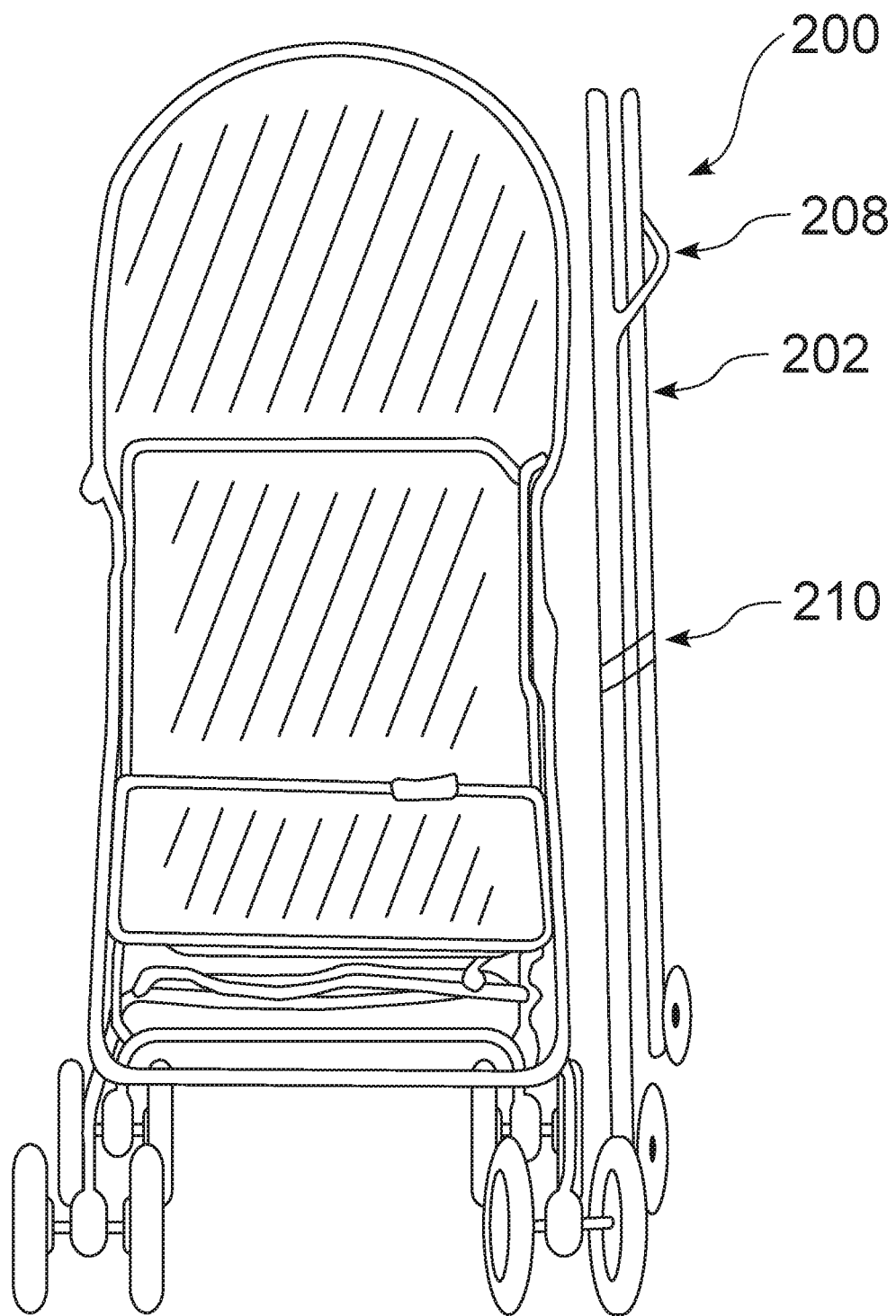
FIG. 2 is a front view of a safety apparatus in the closed configuration according to various embodiments of the disclosure.

FIG. 2 is a perspective view of a safety apparatus 200 in the closed configuration. In some embodiments, the safety apparatus 200 is adjustable or collapsible, which permits its footprint to be reduced when not in use. The safety apparatus 200 of FIG. 2 is approximately 20-28 inches wide in the open configuration, and approximately 2-4 inches wide in the closed configuration. The height and/or length of the safety apparatus 200 may also vary depending on the configuration. In some embodiments, the structural frame 202, front support bar 208, and/or lateral support bar(s) 210 include a telescoping mechanism that allow the width, height, and/or length of the safety apparatus 200 to be adjusted. The telescoping mechanism(s) allow the structural frame 202 to be more compact when fully retracted, which makes the safety apparatus 200 easier to store, carry, and transport.

Figure 3:
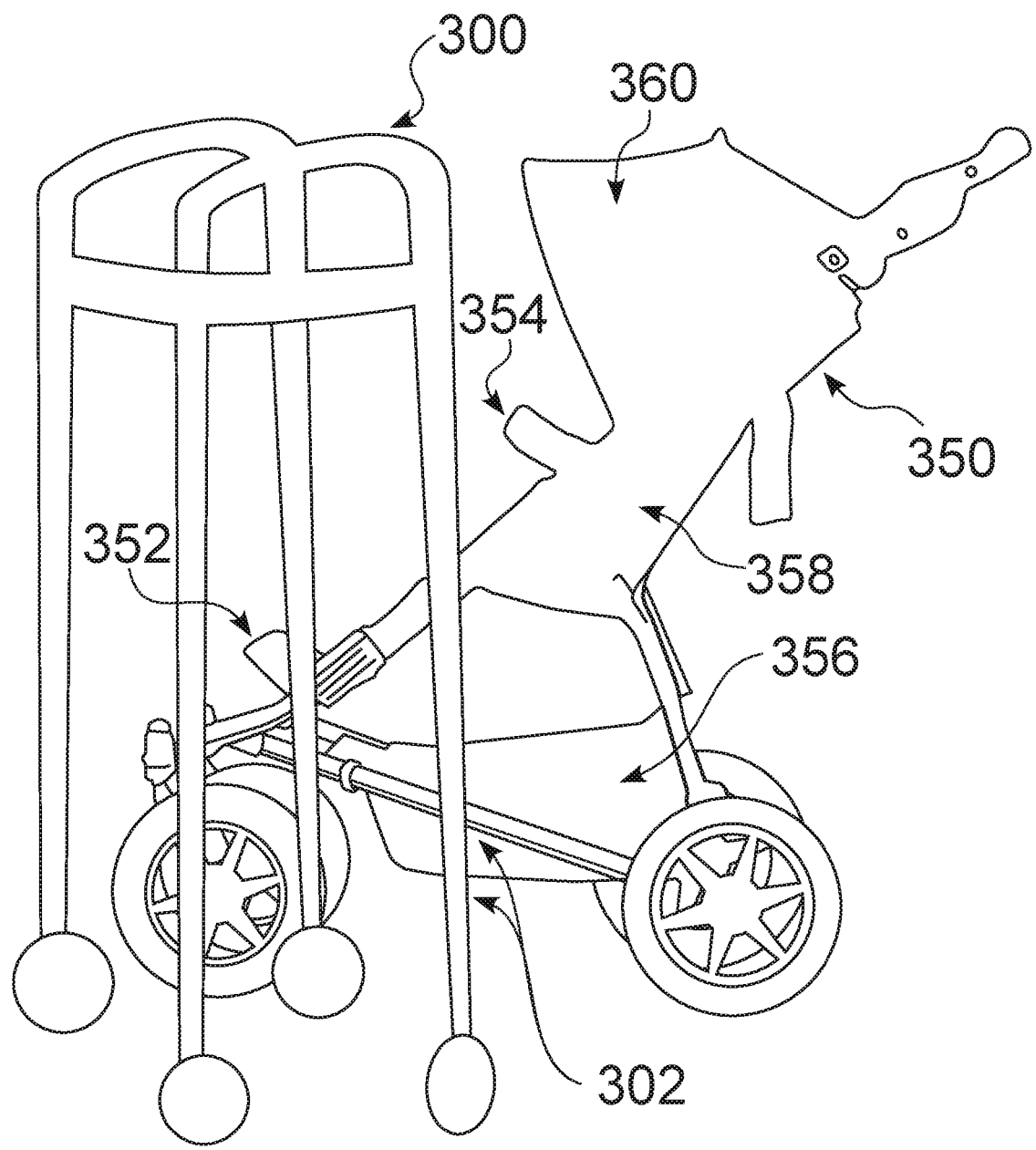
FIG. 3 is a side view of a carriage device connected to a safety apparatus in the closed configuration according to one embodiment of the disclosure.

FIG. 3 is a front view of a carriage device 350 connected to a safety apparatus 300 in the open configuration. In some embodiments, the safety apparatus 300 and carriage device 350 form a single structural frame 302. Consequently, connectors, such as connectors 114 of FIG. 1, are not necessary in such embodiments. The carriage device 350 can include a leg rest 352, restraining bar 354, carriage basket 356, seat/back support 358, and/or a sun visor 360. The carriage device 350 can also include front ground contacts and/or rear ground contacts similar to the ones of the safety apparatus.

In some embodiments, the leg rest 352 and/or restraining bar 354 are coupled to the structural frame 302 by securing mechanisms such as straps, clips, magnets, etc. In other embodiments, the leg rest 352 and/or restraining bar 354 are part of the structural frame 302. For example, the leg rest 352 may be welded to the structural frame 302. As described above with respect to FIG. 1, the structural frame 302, leg rest 352, and restraining bar 354 can be made of metals, polymers, or some combination thereof. The structural frame 302, leg rest 352, and/or restraining bar 354 can be made of the same, or different, materials. For example, the structural frame 302 may be made of steel, while the leg rest 352 is made of plastic and the restraining bar 354 is made of aluminum. A seat/back support 358, which is reinforced by the structural frame 302, allows a stationary party to comfortably sit within the carriage device 350. In some embodiments, the restraining bar 354, the seat/back support 358, or both include a padded covering that is made of cloth, foam, etc.

The carriage device 350 includes a carriage basket 356 in some embodiments that provides additional storage space. The carriage basket 356 can include a metal, thread, or plastic mesh netting and a metal frame that is detachably connectable to and from both the carriage device 350 and the safety apparatus 300. For example, the carriage basket 356 may be secured to the structural frame 302 of the safety apparatus 300 when in the open configuration and secured to the carriage device 350, e.g. under the seat/back support 358, when the safety apparatus 300 is in the closed configuration.

Figure 4:
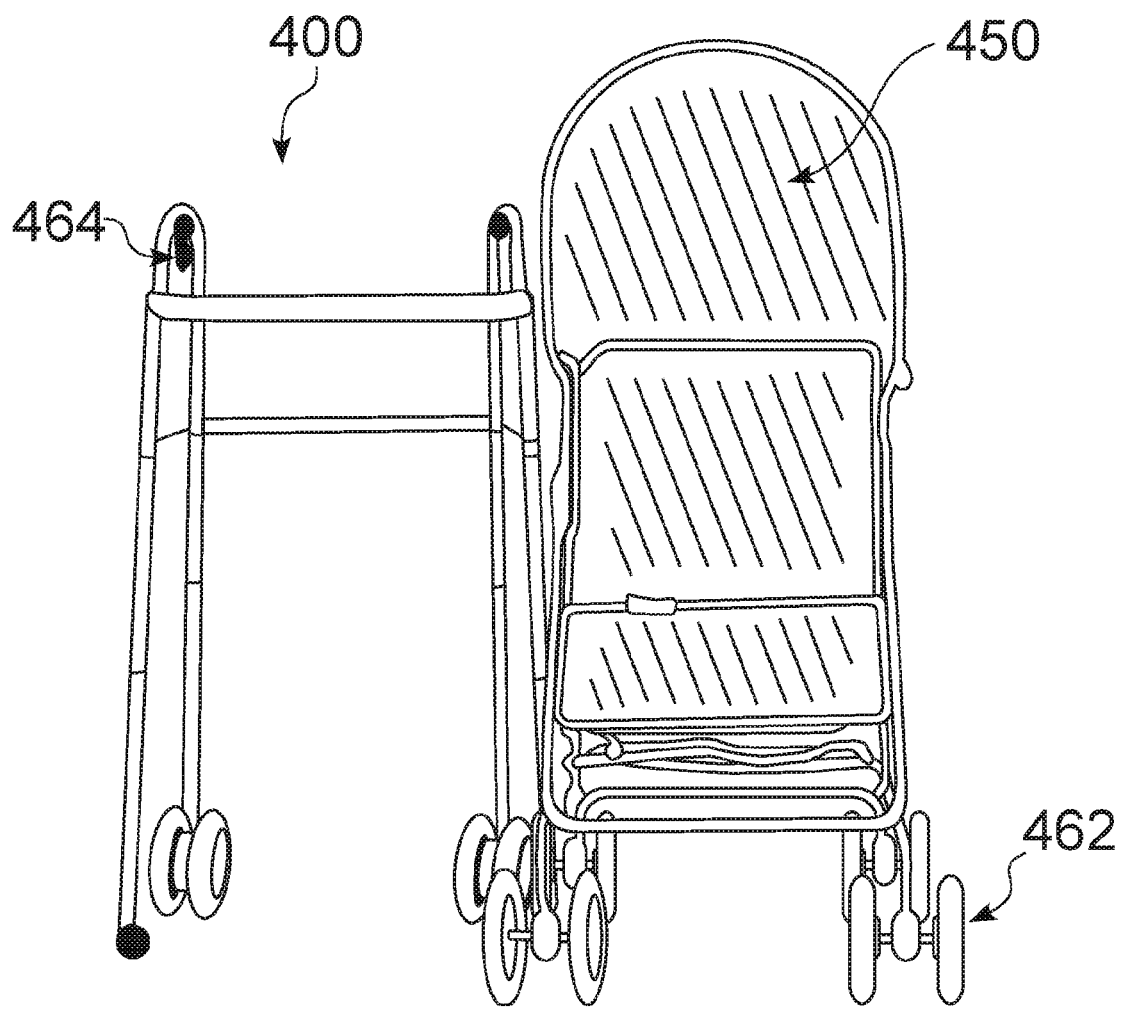
FIG. 4 is a rear view of a carriage device connected to a safety apparatus in the open configuration according to one embodiment of the disclosure.

FIG. 4 is a rear view of a carriage device 450 connected to a safety apparatus 400 in the open configuration. As described above, either or both of the safety apparatus 400 and carriage device 450 can include front contacts and/or rear contacts. For example, the carriage device 450 of FIG. 4 includes carriage wheels 462, while the safety apparatus 400 includes rubber feet. In some embodiments, the safety apparatus 400, the carriage device 450, or both include brake handles 464 that allow a user to lock the carriage device 450 and/or safety apparatus 400 in place. For example, the safety apparatus 400 may include brake handles 464 corresponding to its own wheels or to the carriage wheels 462 of the carriage device 450. That is, a user may be able to lock the carriage device 450 in place by applying pressure to brake handles 464 coupled to the safety apparatus 400. In some embodiments, brakes can be manually engaged by a user, e.g. by flipping a brake lock located near some or all of the wheels.

Figure 5A:
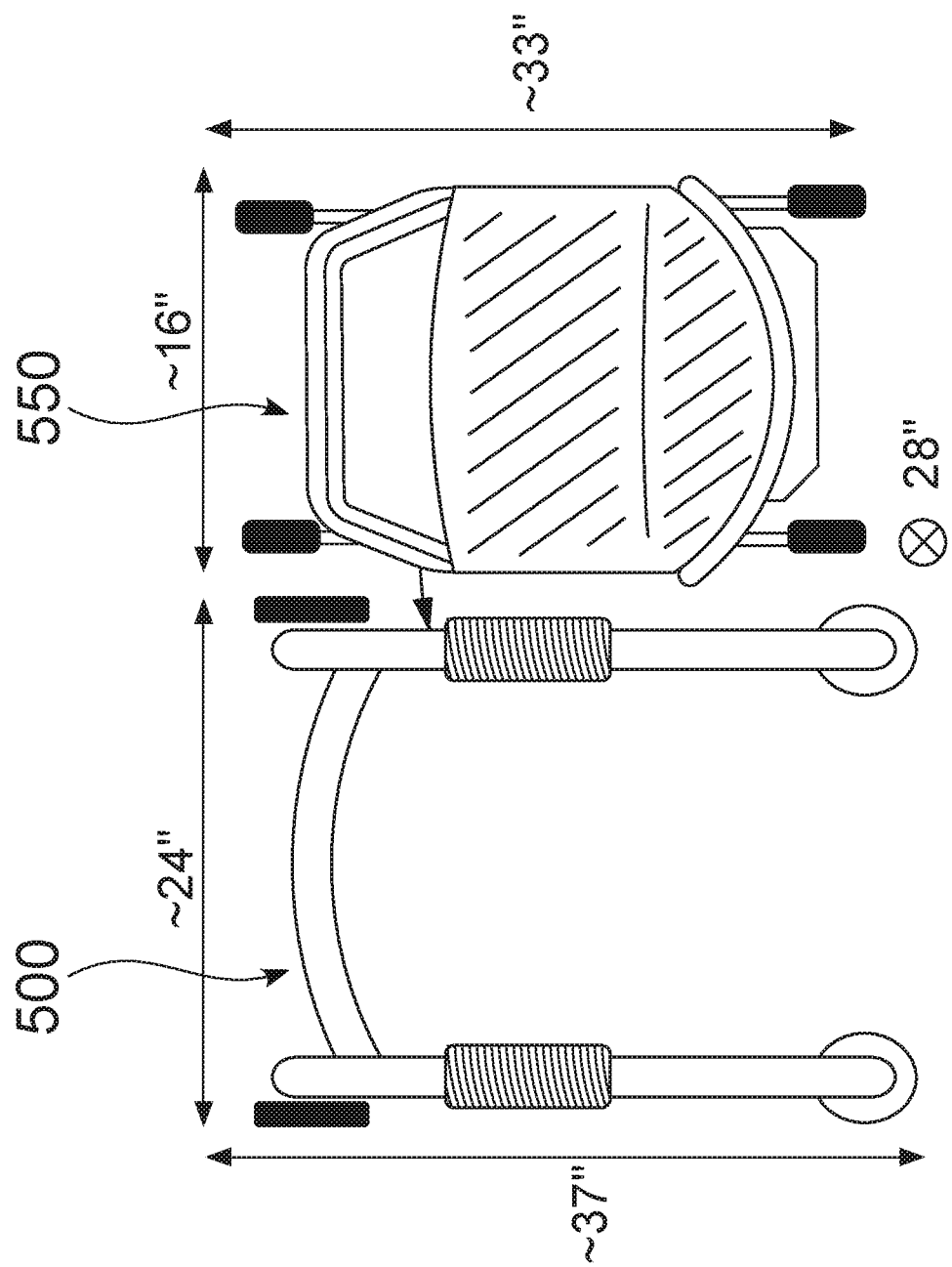
FIGS. 5A and 5B are top views of a safety apparatus in the open configuration and the closed configuration, respectively, according to one embodiment of the disclosure.
Figure 5B:
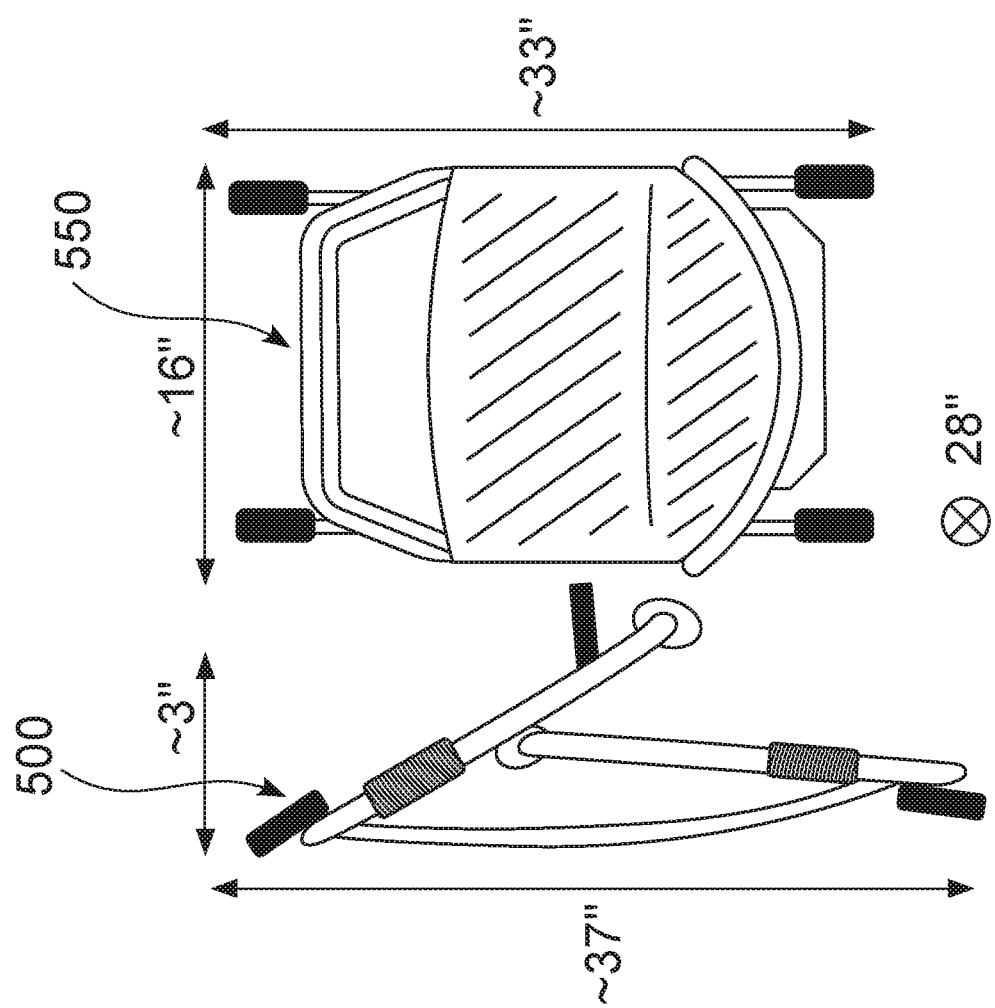

FIGS. 5A and 5B are top views of a safety apparatus 500 in the open configuration and the closed configuration, respectively, according to one embodiment of the disclosure. The carriage device 550 of FIGS. 5A and 5B, which is illustrated as a traditional stroller, is approximately 16 inches wide, 28 inches tall, and 33 inches long. When in the open configuration, the safety apparatus 500 is approximately 24 inches wide, 28 inches tall, and 37 inches long. When in the closed configuration, the width of the safety apparatus 500 is reduced to approximately 3 inches. Other embodiments of safety apparatuses 500 and/or carriage devices 550 may result in different measurements. As shown in FIGS. 5A and 5B, the safety apparatuses described herein place the stationary party laterally adjacent to, rather than in front of or behind, the user. In some embodiments, the structural frame and connectors of the safety apparatus are designed for a particular model or type, e.g. stroller, wheelchair, of carriage device. In other embodiments, the structural frame and connectors are adjustable, which allows a single safety apparatus to be compatible with carriage devices of different types.

The structural frame, front support bar, and/or lateral support bars can be set up in different arrangements when in the closed configuration. For example, one or both of the lateral sides of the structural frame may be configured to rotate behind the front support bar, as shown in FIG. 5B. As another example, the front support bar may be removed, repositioned, or tilted, which allows the lateral sides to relocated directly adjacent to one another, i.e. neighboring without any intervening components.

Figure 6:
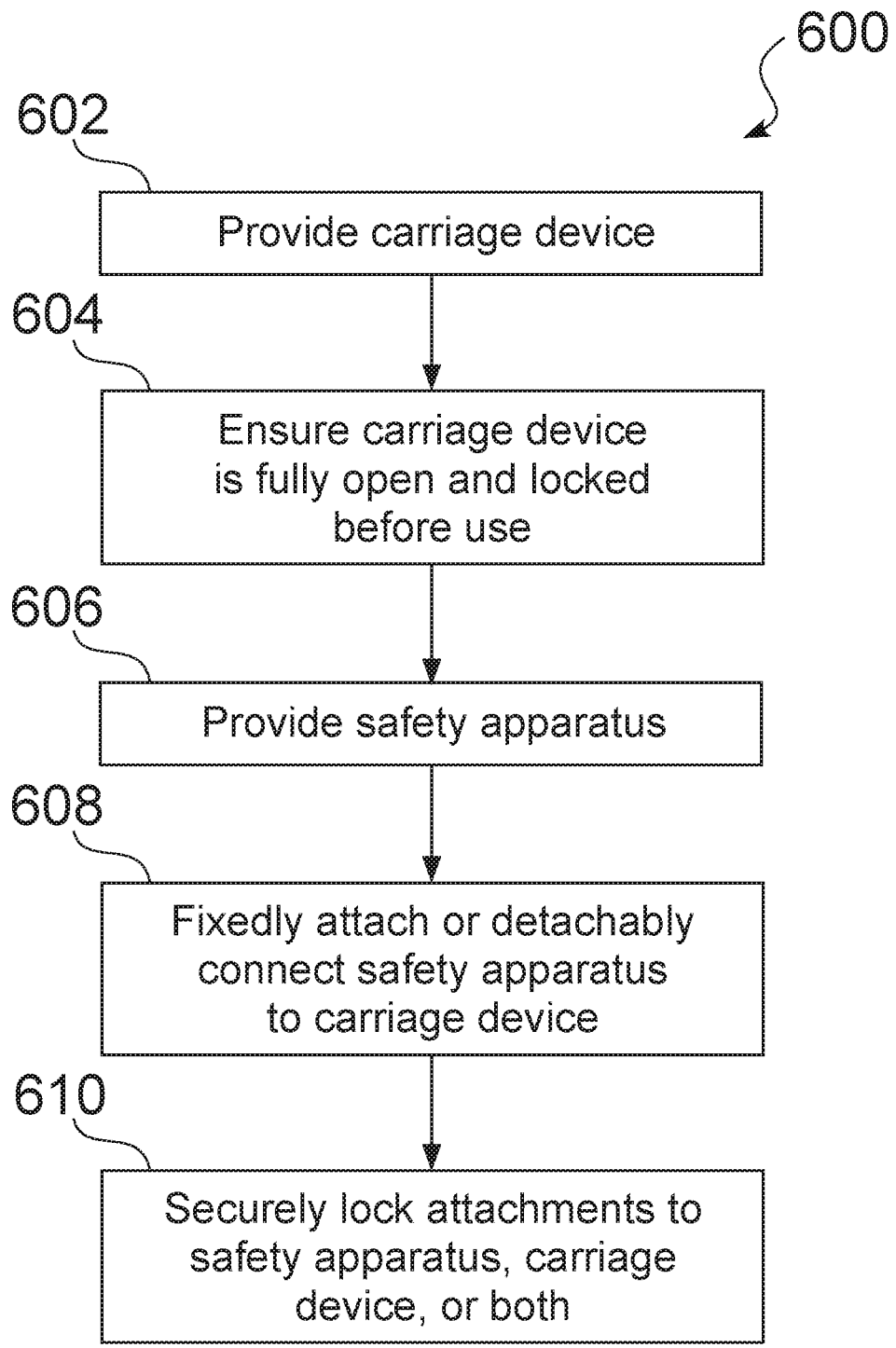
FIG. 6 is a process for providing and securing a safety apparatus to a carriage device according to various embodiments of the disclosure.

FIG. 6 is a process 600 for providing and securing a safety apparatus to a carriage device according to various embodiments of the disclosure. Various embodiments may include all or some of these steps, which can be performed in any order unless physically impossible.

At block 602, a carriage device, e.g. stroller, wheelchair, is provided that is capable of being connected to a safety apparatus. At block 604, a user ensures the carriage device is fully open and locked prior to being used. Generally the carriage device is fully opened before being attached to the safety apparatus, although some embodiments allow the carriage device and safety apparatus to be attached while one or both are in a closed configuration. At block 606, the safety apparatus is provided that includes at least a structural frame and connectors. At block 608, the safety apparatus is fixedly attached or detachably connected to the carriage device. The safety apparatus can be fixedly attached through the use of a securing plate, screws, nuts, etc., or can be detachably connected through the use of a quick-release button, turn-knob, clip, etc. At block 610, any attachments are securely locked to the safety apparatus, carriage device, or both. Possible attachments include, but are not limited to, storage baskets and trays, hooks for bags, clothing, water bottle cages, cup holders, and light accessories. In some embodiments, the attachments are specially designed and manufactured for the safety apparatus and/or carriage device.

Figure 7:
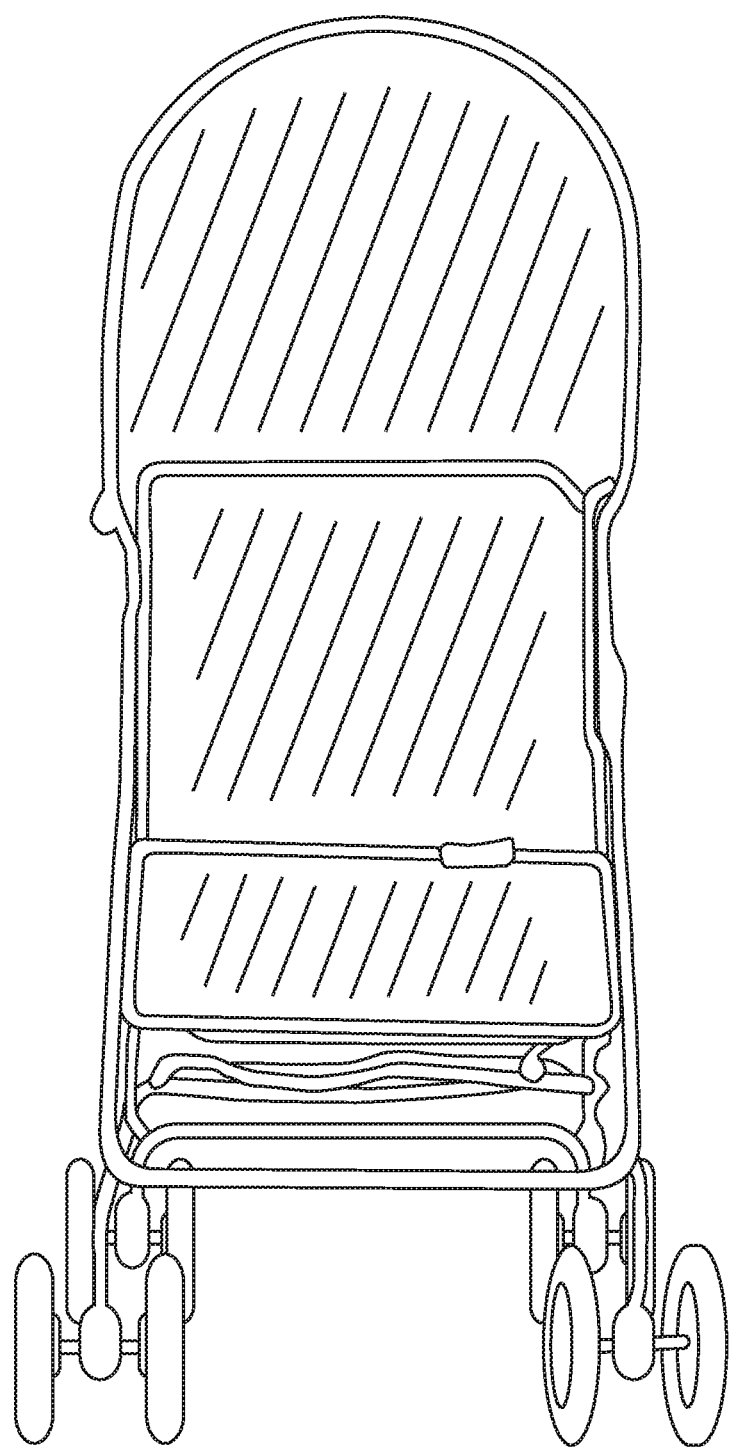
FIGS. 7-8 are assorted views of safety apparatuses according to various embodiments of the disclosure.
Figure 8:
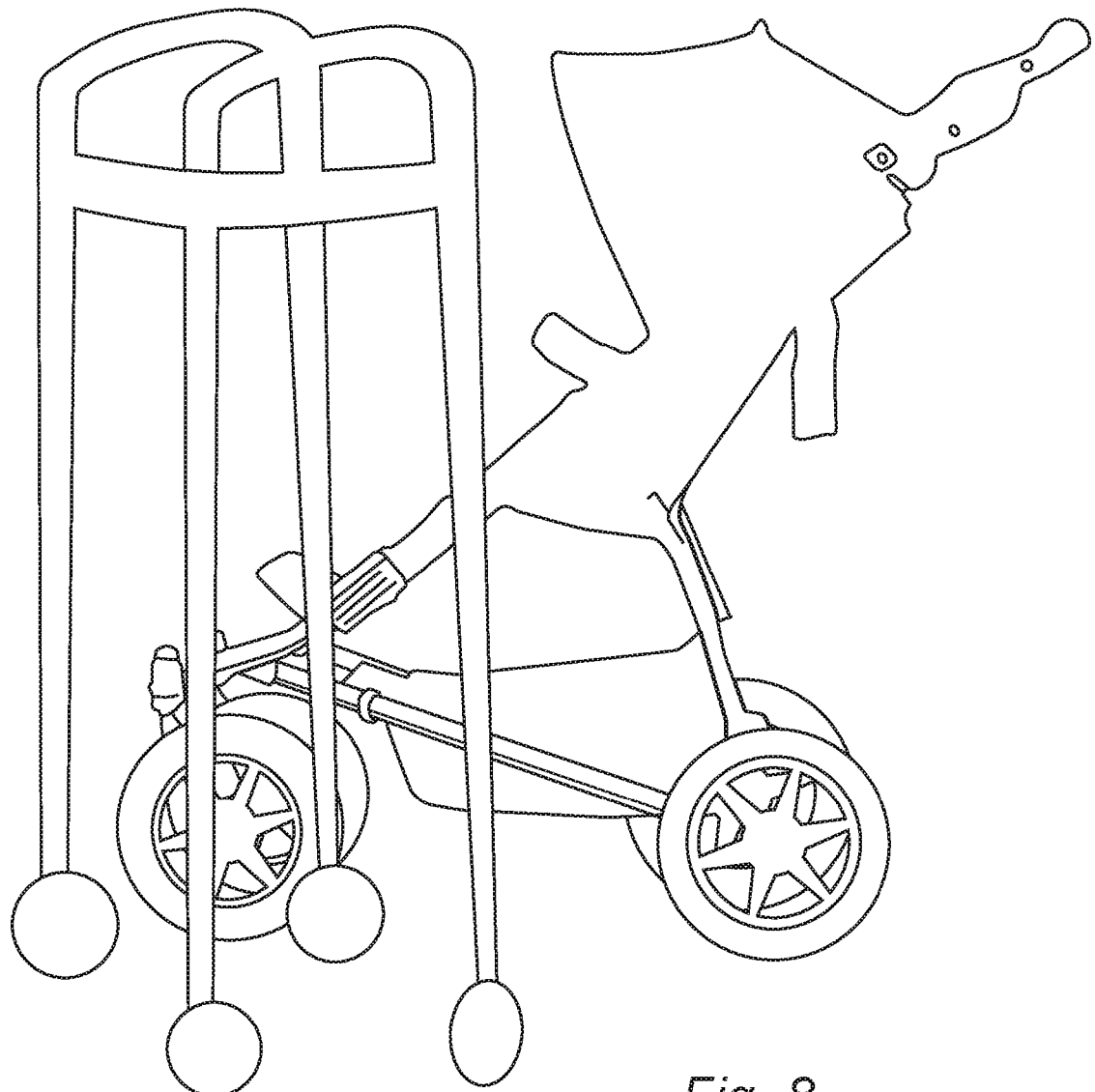

FIGS. 7-8 are assorted views of safety apparatuses according to various embodiments of the disclosure.

The language used in the Detailed Description has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A safety apparatus comprising:
    two or more substantially U-shaped members spaced apart in a substantially parallel relationship to each other, each of said members having downward facing opposed arms, an extent of each arm contacting a traverse surface;
    at least one spacer that establishes a rigid spaced relationship between said substantially U-shaped members; and
    one or more connectors with which one of said substantially U-shaped members is securely fastened to an occupied carriage device to maintain said safety apparatus in a fixed position side-by-side to said carriage device.

2. The safety apparatus of claim 1, wherein the at least one spacer is foldable at the connector of the spacer and the substantially U-shaped member so as to bring said substantially U-shaped members substantially together.

3. The safety apparatus of claim 1, further comprising substantially U-shaped members each having a grip.

4. The safety apparatus of claim 1, further comprising substantially U-shaped members spaced apart to permit an operator to stand between them.

5. The safety apparatus of claim 1, further comprising a connector with a mechanism for fixedly attaching the safety apparatus to the carriage device.

6. The safety apparatus of claim 1, further comprising one of the one or more connectors with a mechanism for detachably connecting the safety apparatus to the carriage device.

7. The safety apparatus of claim 1, further comprising a telescoping mechanism for selectively altering a distance between the two or more substantially U-shaped members.

8. The safety apparatus of claim 1, further comprising a telescoping mechanism for selectively altering the distance between one of the two or more substantially U-shaped member and the carriage device.

9. The safety apparatus of claim 1, wherein one of the two or more substantially U-shaped member serves as at least a portion of a structural frame of the carriage device.

10. A method comprising:
    assembling a safety apparatus including
        two or more substantially U-shaped members spaced apart in substantially parallel relationship to each other, said members each having downward facing opposed arms, an extent of each of which contacts a traverse surface;
at least one spacer that establishes a rigid spaced relationship between said substantially U-shaped members; and
one or more connectors with which one of said substantially U-shaped members is securely fastened to an occupied carriage device to maintain said safety apparatus in a fixed position side-by-side to said carriage device; and
enabling a user to connect the safety apparatus directly adjacent to an occupied carriage device, so that the safety apparatus and the occupied carriage device move in tandem when the user applies a force to at least one of the substantially U-shaped members.

\* \* \* \* \*